June 16, 1931.　　　D. B. GISH　　　1,810,762
　　　　　　　　　　　AEROPLANE
　　　　　Filed Aug. 15, 1930　　2 Sheets-Sheet 1
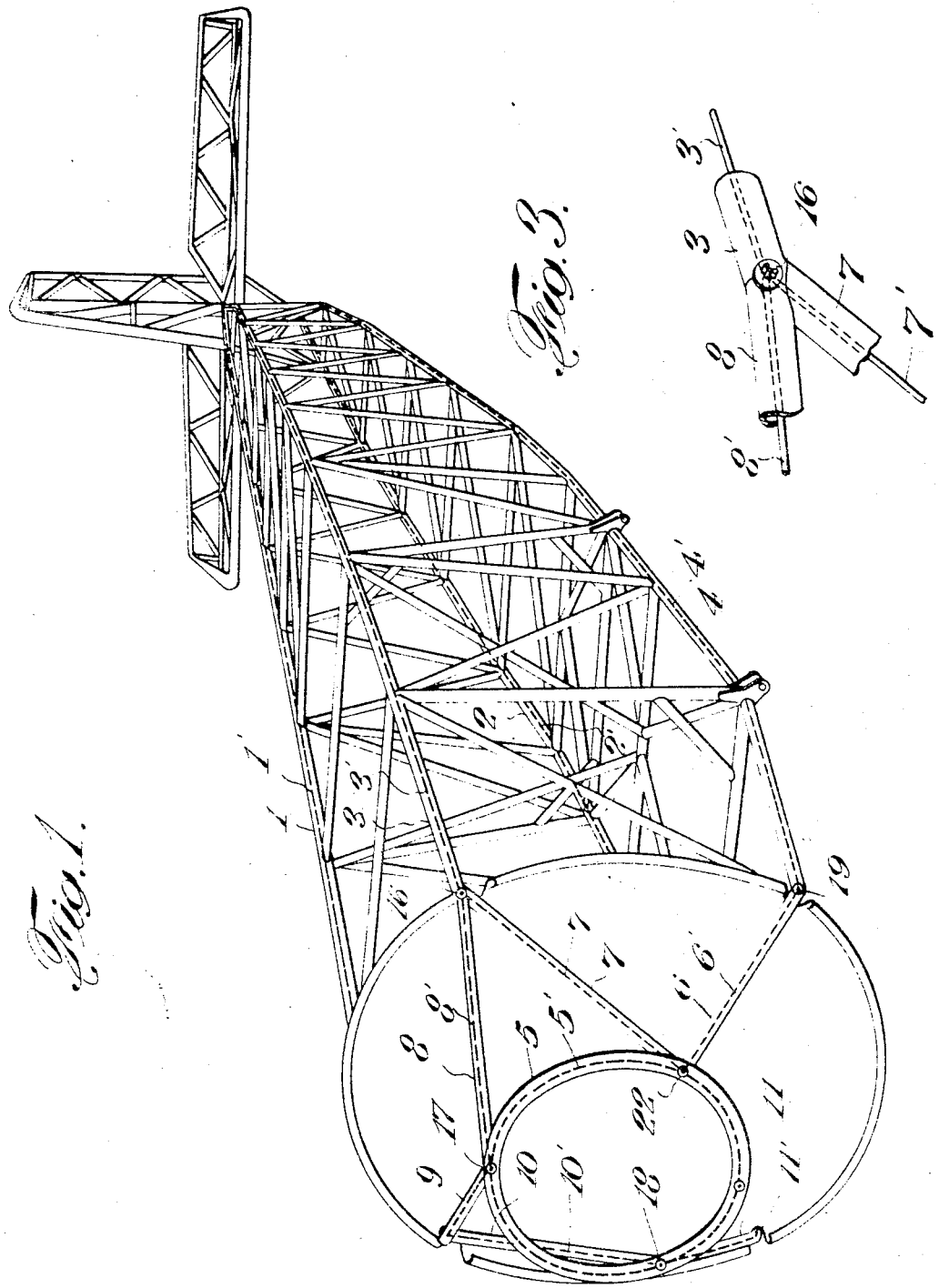
INVENTOR
BY Daniel B Gish
ATTORNEYS June 16, 1931.  D. B. GISH  1,810,762
AEROPLANE
Filed Aug. 15, 1930   2 Sheets-Sheet 2
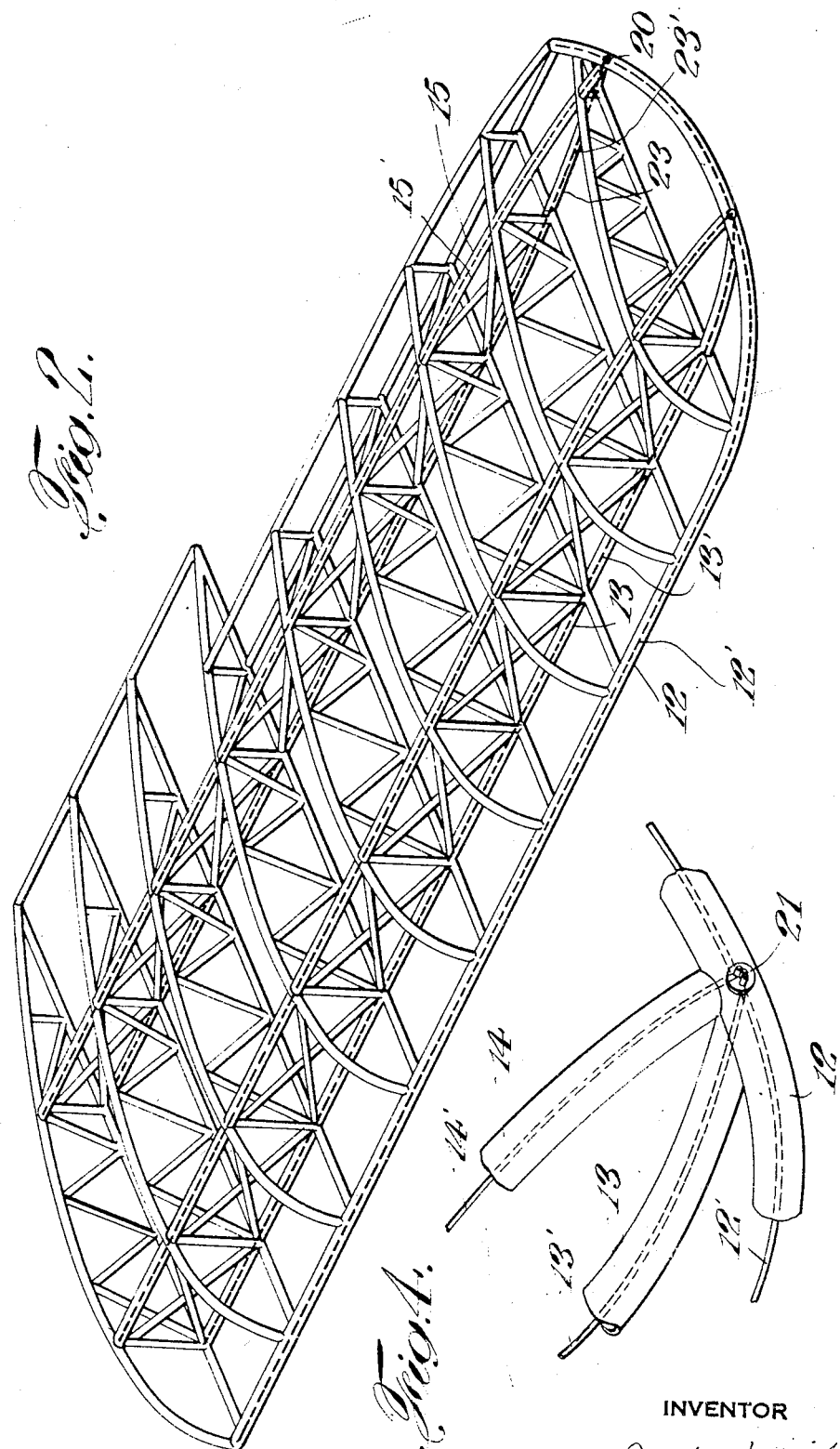
INVENTOR
BY Daniel B. Gish
ATTORNEYS Patented June 16, 1931

1,810,762

UNITED STATES PATENT OFFICE

DANIEL B. GISH, OF WORCESTER, MASSACHUSETTS

AEROPLANE

Application filed August 15, 1930. Serial No. 475,477.

This invention relates in general to aeroplane fuselage and wing construction, and more particularly to safety devices in connection with wings and fuselages made up of steel tubing.

It is generally agreed that in structures made up of metal tubing the welding together of the several adjacent parts renders the actual welded joint as strong as the major portion of the tube, provided the preheating is properly done, but due to the human element many times the preheating is not properly done and consequently the weld is much weaker and breaks apart under strain or vibration. Specifically in aeroplane construction, wherein stresses and strains are practically continuously in effect, it is of particular importance to guard against a breakage of the component parts of the construction. This is especially true in regard to the longérons of the fuselage and the wing spars, for the reason that breakage due to crystallization or fatigue of the tube at the weakened portion at the welded joint, allows the broken ends to fall out of alignment and consequently disalign the entire construction when stresses or strains are so applied as to cause this relative movement.

It is an object of this invention therefore to provide means to safeguard against this disalignment, in the event that a breakage should occur while the aeroplane is in flight, and moreover to maintain a reasonably proper alignment under these conditions and render the aeroplane maneuverable, practically as well as it would be under normal conditions.

To this end, I propose to arrange cables, rods or tubes, or the like, within the hollow tubes, particularly those constituting the longérons, wing spars, and engine mount. These cables are not to be connected with one another and on the contrary they merely extend outwardly at each end of a tube and after having been pulled only to such an extent as no slack therein will exist, they are tied. It is of essential importance that these cables, when installed, shall not be put under tension, as this might easily be the cause of an added tendency on the part of the structure to buckle under a breakage and continued pivotal strain due to outside forces.

My particular object is therefore not to reinforce the tube, nor to place the inserted cable under tension, but rather is merely to counteract against a disalignment of the adjacent ends of a broken hollow tubing and a consequent buckling or other disalignment induced by outside causes after such part has broken.

With the foregoing and other objects in view, the invention consists in the combination of parts and in the details of construction hereinafter set forth in the following specification and the appended claims, certain embodiments of my invention being illustrated in the accompanying drawings, in which:

Fig. 1 is a view in perspective of the aeroplane fuselage framework, partly broken away, the cable being shown in dotted lines within the tubing.

Fig. 2 is a similar view in perspective of the aeroplane wing.

Fig. 3 is an enlarged detail fragmentary view in perspective of a portion of that shown in Fig. 1.

Fig. 4 is an enlarged detail fragmentary view in perspective of a portion of that shown in Fig. 2.

Referring more particularly to the drawings, there is shown in Fig. 1 a fuselage provided with four hollow metal longérons 1, 2, 3 and 4 having cables 1', 2', 3' and 4' respectively extending therethrough. There is also shown an engine hollow metal ring mount 5 with braces 6, 7, 8, 9, 10 and 11, the mount and hollow metal braces having cables 5', 6', 7', 8', 9', 10' and 11' respectively extending therethrough.

Each of these cables is pulled only to an extent that no slack will exist and the cable is then locked at each end of the member through which it extends. Care is taken in so fixing the cable that it will not be under tension when installed. One or more ends of the cables may merely be welded to the end of the metal tube or may be extended through and fastened to a small exterior plate 16, such as is shown in Fig. 3. Similar plates are shown at 17, 18, 19 and 22. The fastening of the cables at the rear end of the fuselage may be accomplished in the same manner and is not therefore specifically shown.

A similar system is carried out in connection with the wings in Fig. 2 in which are shown a hollow metal tube leading edge 12, upper and lower front spars 14 and 13, and upper and lower rear spars 15 and 23 with cables 12', 14', 13', 15' and 23' respectively extending therethrough. At the wing tip, the cables 13', 14' and 12' may be jointly connected to a common plate 21, as may be the cables 15' and 23' at plate 20. The opposite end of each cable at the inner end of the wing is however connected individually to the tube or to an individual plate.

In the fuselage, wing and engine mount construction each cable extends merely through a single component part or tube and is fastened at both ends thereof. The cable therefore does not extend from tube to tube or from tube to any other supporting or controlling means. Thus no induced tension caused by outside forces will tend to cause the cable to exert a buckling effect on the construction in the event of a breakage of a tube. On the contrary the cable will act against any such buckling and at the same time act to maintain alignment of the adjacent broken ends of a tube and consequently aid in the maintenance of alignment of the aeroplane rendering it substantially equally maneuverable as if the breakage had not occurred.

Having thus described my invention, I claim:

1. In an aeroplane, the framework of which consists essentially in a plurality of hollow tubes, each of those tubes, which extend longitudinally of the essential parts of an aeroplane and which constitute the main longitudinal support, having an individual cable extending therethrough and tied at each end, each of said cables being arranged so as to be taut but not under tension.

2. In an aeroplane, the framework of which consists essentially in a plurality of hollow tubes, each of those tubes, which extend longitudinally of the essential parts of an aeroplane and which constitute the main longitudinal support, having an individual cable extending therethrough and tied at each end, each of said cables being arranged so as to be free from slack and tension and tending to maintain alignment of said tubes when broken.

In testimony whereof, I have signed my name to this specification this 13th day of August, 1930.

DANIEL B. GISH.